No. 689,068. Patented Dec. 17, 1901.
H. F. DIERCKS.
COMBINED CORN CUTTER, SHELLER, AND HUSKER.
(Application filed Apr. 16, 1901.)
(No Model.) 3 Sheets—Sheet 1.
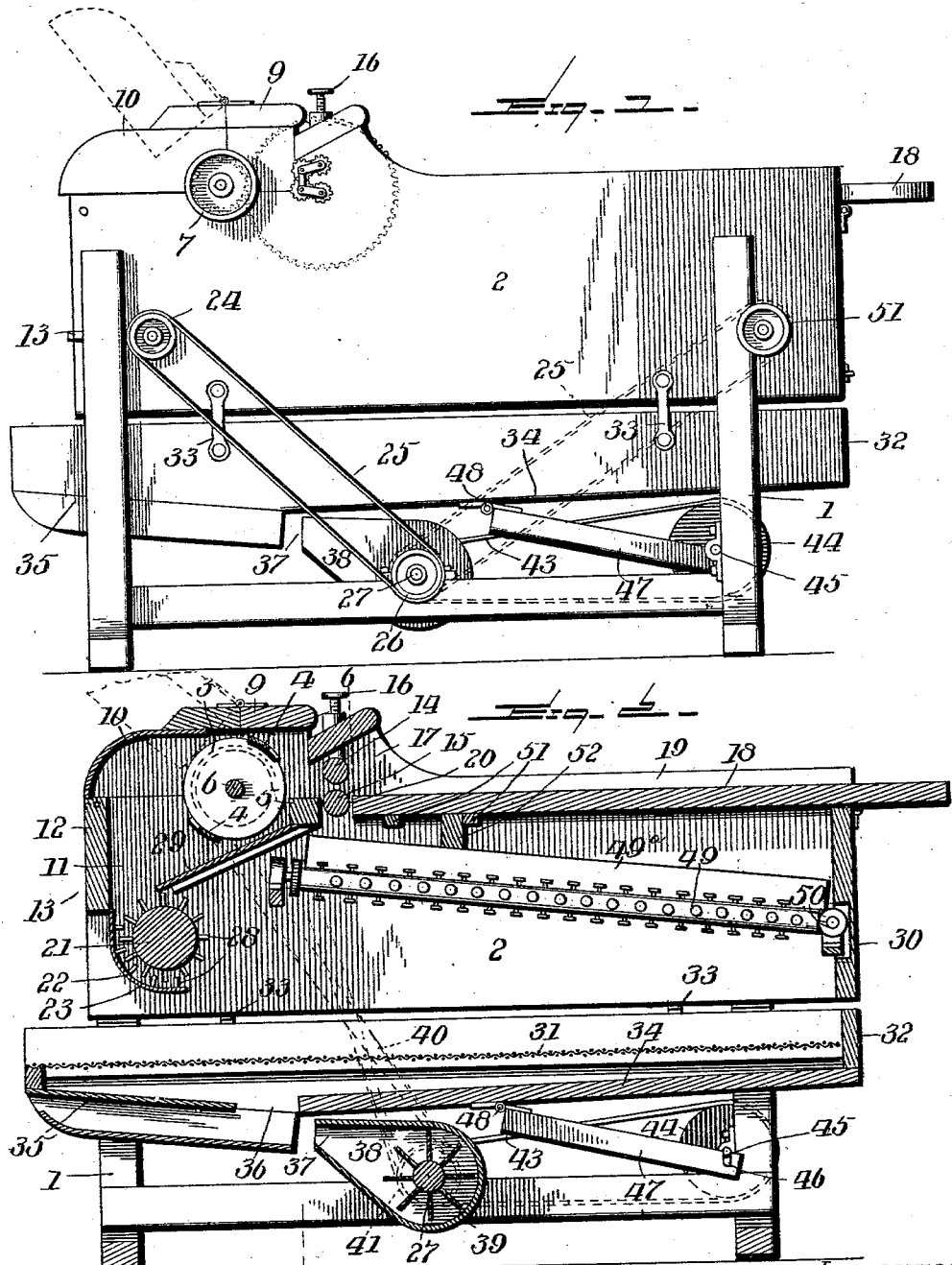
INVENTOR
Henry F. Diercks,
BY
Attorney
WITNESSES:

No. 689,068. Patented Dec. 17, 1901.
H. F. DIERCKS.
COMBINED CORN CUTTER, SHELLER, AND HUSKER.
(Application filed Apr. 16, 1901.)
(No Model.) 3 Sheets—Sheet 2.
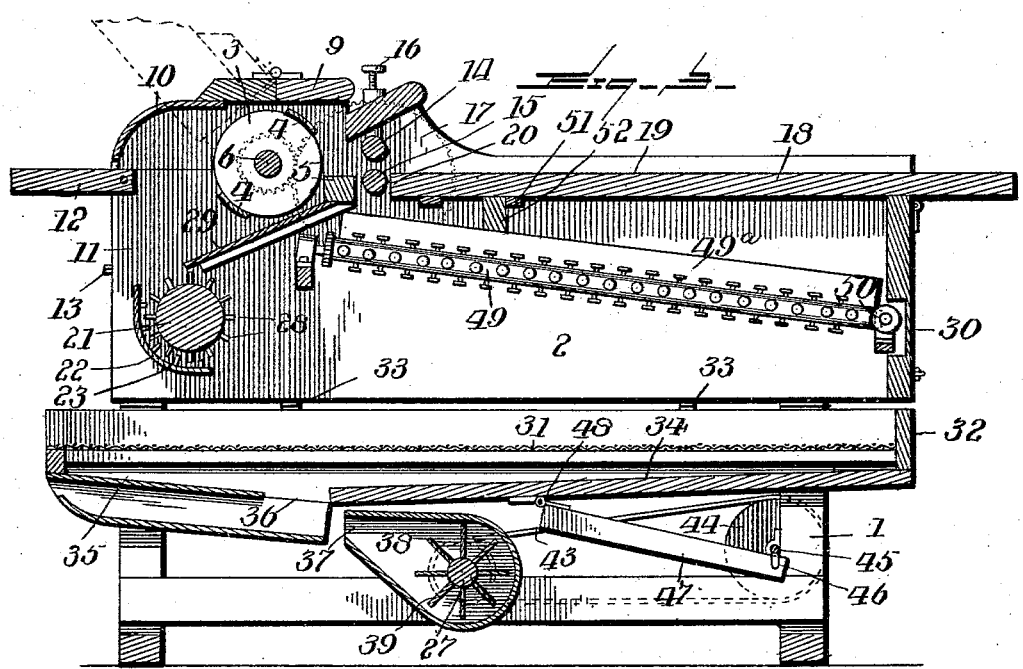
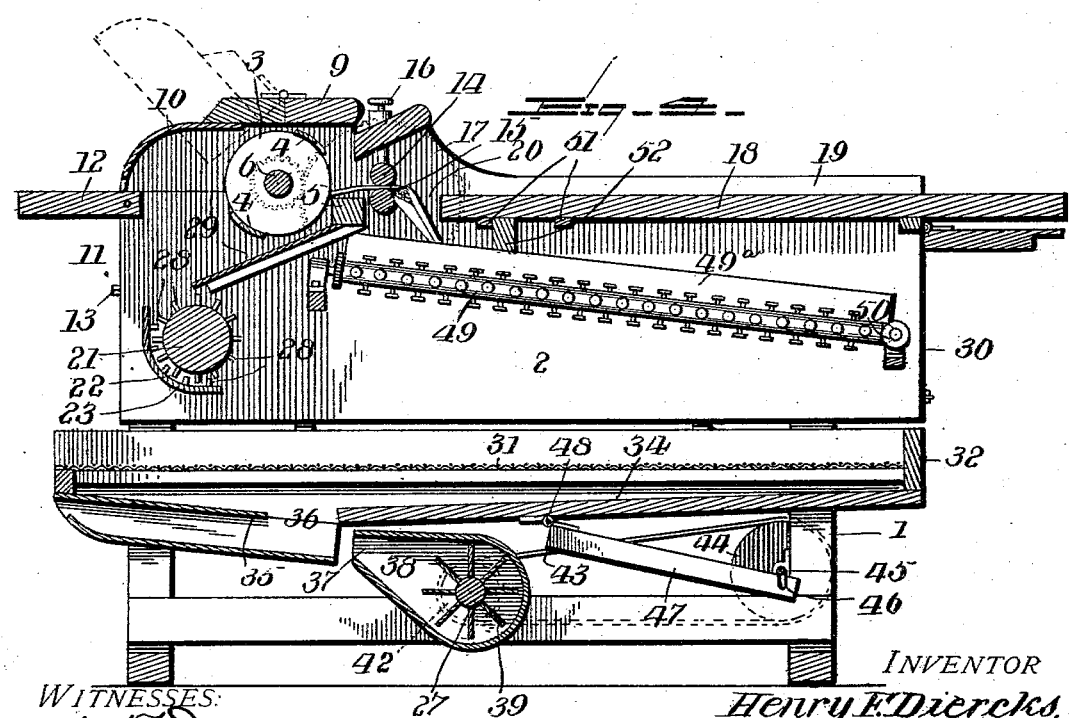
WITNESSES:
INVENTOR
Henry F. Diercks,
BY
Attorney

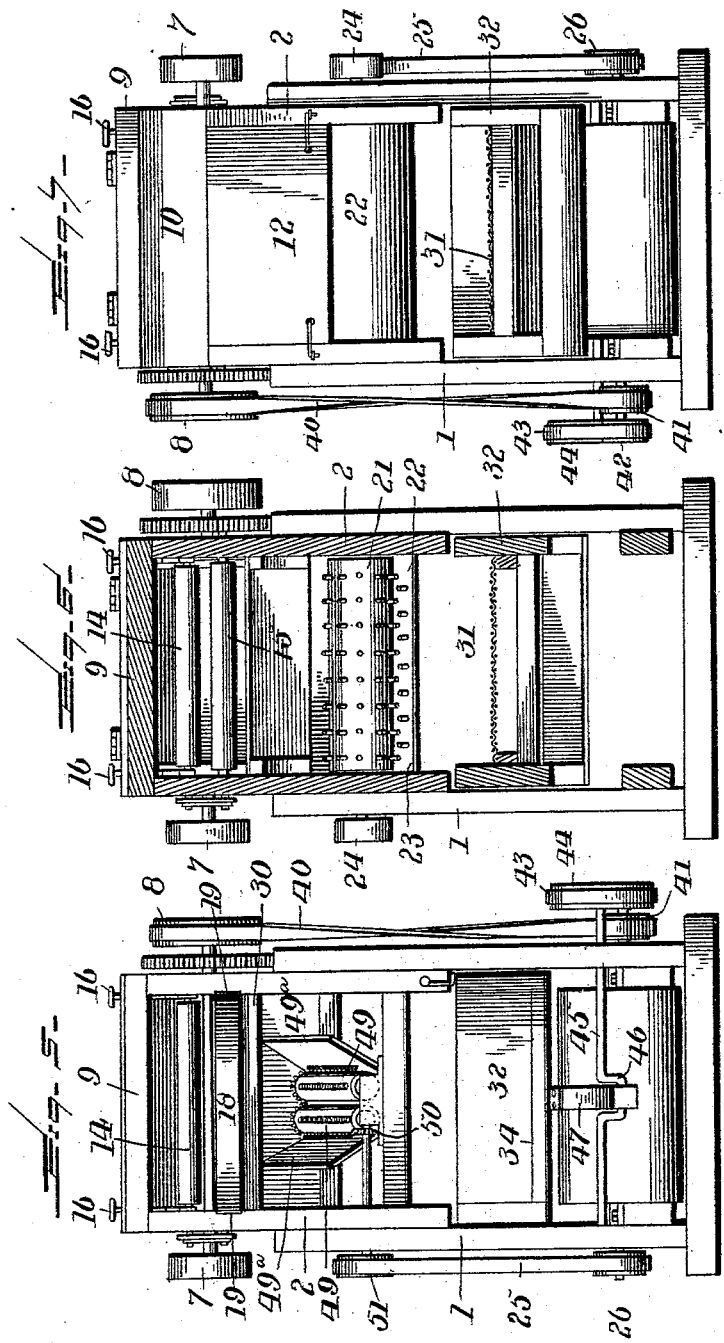

UNITED STATES PATENT OFFICE.

HENRY F. DIERCKS, OF DUNDEE, ILLINOIS.

COMBINED CORN CUTTER, SHELLER, AND HUSKER.

SPECIFICATION forming part of Letters Patent No. 689,068, dated December 17, 1901.

Application filed April 16, 1901. Serial No. 56,117. (No model.)

*To all whom it may concern:*

Be it known that I, HENRY F. DIERCKS, a citizen of the United States, residing at Dundee, in the county of Kane and State of Illinois, have invented certain new and useful Improvements in a Combined Corn Cutter, Sheller, and Husker; and I do hereby declare the following to be a full, clear, and exact description of the invention, such as will enable others skilled in the art to which it appertains to make and use the same.

This invention relates particularly to that type of machines for cutting and shelling corn on the cob and stalk, and has special reference to an improved machine of this character which combines in a single structure mechanism for cutting, shelling or threshing, cleaning, and separating, and for husking the corn.

To this end the invention contemplates a novel construction of combined corn cutter, sheller, and husker embodying such arrangement of the different mechanisms as to permit of the machine being used in such a way as to treat the corn in any manner that may be desired or necessary without having to resort to separate machines for the separate operations, as is now usually done. In this aspect the invention has in view an arrangement whereby the machine may be utilized as a feed or fodder cutter alone for cutting up the stalks and corn for fodder purposes when the corn is of such a nature as not to warrant an attempt to separate out the kernels, as a combined cutter and sheller, including cleaning and separating devices, and also as a combined cutter and husker without bringing the shelling or threshing mechanism into play.

With these and many other objects in view, which will more readily appear to those familiar with the art as the nature of the invention is better understood, the same consists in the novel construction, combination, and arrangement of parts hereinafter more fully described, illustrated, and claimed.

The essential features of the invention involved in the objects above specified are necessarily susceptible to modification without departing from the spirit or scope of the invention, but the preferred embodiment of the improvements is shown in the accompanying drawings, in which—

Figure 1 is a side elevation of the combined corn cutter, sheller, and husker embodying the improvements contemplated by the present invention, showing in dotted lines a belt arrangement which may be utilized for driving the husking-rolls when the machine is used as a combined cutter and husker. Fig. 2 is a vertical longitudinal sectional view of the complete machine, showing the arrangement of parts when the machine is used as a combined cutter and sheller, including the cleaning and separating devices. Fig. 3 is a similar view of the complete machine with the parts arranged to adapt the machine for use solely as a feed or fodder cutter. Fig. 4 is a similar view showing the feed-rolls arranged to act as strippers for stripping the corn-ears from the stalk and coöperating with the husking-rolls, thus adapting the machine for use as a combined cutter and husker. Fig. 5 is a rear end view of the machine, showing the arrangement of gearing for the husking-rolls. Fig. 6 is a vertical transverse sectional view on the line 6 6 of Fig. 2 looking in the direction of the cutting and shelling mechanism. Fig. 7 is a front end view of the machine.

Like numerals of reference designate corresponding parts in each of the figures of the drawings.

In carrying out the invention one of the essential features thereof is to house the entire mechanism for performing the different operations in a single casing or frame, and while this casing or frame may be constructed in any suitable manner the same is preferably of rectangular form, built within a suitable stand or framework. For illustrative purposes the stand or framework is designated by the numeral 1 and the casing proper by the numeral 2.

Within the top portion of the casing 2, contiguous to one end thereof, is mounted a rotary or revoluble cutter 3. This rotary or revoluble cutter 3 may be of any approved construction, but is preferably of the type ordinarily employed for cutting straw, hay, and the like and essentially comprises a horizontally-arranged body carrying a plurality of longitudinal knives 4, coöperating with a stationary knife or ledger-blade 5, arranged in fixed position transversely of the casing 2 and contiguous to the periphery of the cutter 3, so that the combined action of the knives 4 and 5 will serve to cut the material fed between the same. The rotary cutter 4 is carried by a transverse cutter-shaft 6, journaled in suitable bearings at the sides of the casing and carrying upon its extremities, exterior to the casing, the belt-pulleys 7 and 8, respectively, the pulley 7 preferably constituting the driving-pulley, which receives the driving-belt for communicating motion to the different mechanisms of the machine. The rotary cutter 3 is preferably mounted within a top housing 9, provided at the upper side of the casing and at one end thereof, and said housing is formed with a hinged cap-section 10, which provides a cover for the cutter-housing, so that convenient and ready access may be had thereto should this ever be necessary during the operation of the machine or for purposes of repair or adjustment. Immediately below the plane of the hinged cover or cap 10 and beyond the rotary cutter 3, within the horizontal plane thereof, the casing is provided with an end fodder-discharge opening 11, which is adapted to be covered and uncovered by the discharge-door 12, which is hinged or otherwise suitably connected with the casing and is adapted to be held in its closed position by means of suitable latches or equivalent fastenings 13.

At the side of the rotary cutter 3, opposite the end fodder-discharge opening 11 and contiguous to said cutter, are located a pair of superposed vertically-alined feed-rolls 14 and 15, the spindle extremities of which rolls are journaled in suitable bearings at the side of the machine-casing and one or both of which rolls, preferably the upper one, 14, is adjustable to provide for varying the space between the rolls so as to properly adapt the machine for cutting and husking purposes when this is desired. Any suitable means may be resorted to for effecting this relative adjustment of the feed-rolls; but a simple construction is shown in the drawings, and consists in associating the adjusting-screws or equivalent adjusting devices 16 with the vertically-movable bearings for the movable roll 14. The two feed-rolls 14 and 15 are arranged within a flared receiving-mouth 17, provided at one side of the top housing 9 for the rotary cutter, and the cornstalks, with the corn-ears thereon, are fed into said mouth and between the feed-rolls upon the top feed-table 18. The top feed-table 18 is horizontally arranged between the opposite sides of the casing 2 and constitutes the top of the casing; but said feed-table preferably has a sliding engagement at its side edges with suitable guides 19 at the sides of the casing, whereby the inner end of said feed-table may be moved in close proximity to the feed-rolls under certain conditions and also moved a short distance away from said rolls to provide the delivery-opening 20 in front of the rolls when the machine is used as a combined cutter and husker, as shown in Fig. 4 of the drawings. Any suitable fastening means may be utilized with the adjustable or slidable feed-table should this be found desirable in the use of the machine.

Within the same end of the machine-casing as the rotary cutter there is arranged the shelling or threshing mechanism, essentially comprising the rotary shelling-cylinder 21 and the concave 22, associated therewith. The rotary shelling-cylinder 21 is mounted in a lower plane than the rotary cutter 3 and in close proximity to the adjacent end wall of the casing, while the concave 22 for the said shelling-cylinder preferably abuts directly at one end, as at 23, on the end door 12 of the casing and extends beneath the shelling-cylinder in the direction of what might be properly termed the "rear" end of the casing. The shelling-cylinder is journaled transversely within the casing, and one of the shaft extremities thereof has fitted thereon exterior to the casing a belt-pulley 24, which receives a belt 25, deriving its motion from a pulley 26 on the fan-shaft 27, to be presently referred to. Both the shelling-cylinder and its concave are provided with threshing or shredding spike or teeth 28, which coöperate for breaking up the material and effectually shelling the corn from the cob, whereby the material will be placed in proper condition for the final cleaning and separation of the kernels from the cut stalks, cobs, and husks, and the material as it is cut up by the rotary cutter 3 is directed onto the upper side of the revolving shelling-cylinder by means of an inclined delivery-apron 29, arranged transversely within the machine-casing and extending from a point beneath the rotary cutter and at one side of the ledger-blade 5 to a point in close proximity to the upper side of the shelling or threshing cylinder, thus compelling the cut material to be caught up by the shelling-cylinder, carried around through the toothed concave 22, and forcibly thrown by the rapidly-revolving shelling-cylinder longitudinally through and out the casing 2 to the extreme rear end thereof, at which point is arranged the end arresting-board 30. This end arresting-board 30 is in the form of a door, gate, or other removable piece which can be readily opened when the machine is used for husking purposes, but which in the other uses of the machine closes in the rear end of the casing beneath the top feed-table 18 and arrests such heavy portions of the material as will be cast or thrown the full length of the casing by the revolving shelling-cylinder.

The above-described action of the threshing or shelling cylinder in forcibly throwing the threshed material longitudinally throughout the casing from one end to the other serves to spread the material over the separating sieve or screen 31 of the longitudinally-arranged vibratory separating-shoe 32. The heavier portions of the material will necessarily be thrown to the extreme rear portion of the sieve, and therefore be subjected to a separating action the full length of the shoe before being discharged therefrom, while lighter portions of the material, requiring less separation, will be deposited upon the sieve nearer the shelling or threshing cylinder. The vibratory separating-shoe 32 extends longitudinally of the casing the full length thereof, and constitutes a vibratory bottom for the same. The shoe essentially comprises a frame suspended by pivotal hanger-links 33 from the sides of the casing, the separating screen or sieve 31, running the full length of the frame, and a bottom floor 34, arranged below the sieve or screen in spaced relation thereto and provided below the plane of the shelling or threshing mechanism with an inclined front section 35, whose inner end is spaced from the contiguous end of the main floor 34 to provide a blast-opening 36, through which a blast of air is directed from the spout 37 of the fan-casing 38. This fan-casing 38 is mounted in a fixed position beneath the shoe 32 and houses therein a revolving blast-fan 39, mounted upon the fan-shaft 27, previously referred to. Said fan-shaft serves to transfer motion to the belt-pulley 24 of the shelling-cylinder and itself receives motion from a belt 40, passing over a pulley 41 on one end of the fan-shaft and also passing over the belt-pulley 8 on one of the shaft extremities of the transverse cutter-shaft 6. The said fan-shaft also carries upon one end another pulley 42, over which passes a belt 43, which transfers motion to a belt-pulley 44 on one end of a crank-shaft 45, journaled at one end of the framework 1. The crank-shaft 45 is provided with a centrally-arranged crank 46, to which is connected one end of the pitman 47, the other end of which has a pivotal connection at 48 with the under side of the shoe 32.

To adapt the machine for husking, there is arranged longitudinally within the casing, in a plane above the sweep commanded by the shelling-cylinder for throwing the material, a pair of husking-rolls 49 of any approved type. The front ends of these rolls are mounted in proximity to the feed-rolls 14 and 15, beneath the plane of such rolls, while the rear end of the husking-rolls 49 have associated therewith suitable drive-gearing 50, which in the construction shown includes a shaft carrying a pulley 51, onto which may be transferred the belt 25 when it is desired to throw the shelling mechanism out of action and operate the husking-rolls in conjunction with the cutter.

The machine will be principally used as a combined corn cutter and sheller. In such use the husking-rollers 49 are inactive and the discharge-door 12 and the arresting-board 30 closed, so that the cut material is delivered to the shelling mechanism and the latter throws the threshed material over the separating-sieve, while said sieve separates the kernels from the cut husks and stalks and permits the same to discharge through the opening 36. The blast of air passing through said opening cleans the kernels, and the cut husks and stalks are worked off the front end of the shoe contiguous to the shelling mechanism. When the machine is used as a cutter alone, the belt 40 is unshipped, so as to throw all of the mechanism out of action except the cutter, and the door 12 is opened to permit the direct discharge of the cut material. When used as a combined cutter and husker, the feed-rolls 14 and 15 are adjusted together to act as strippers for the corn-ears, the feed-table moved back to provide the delivery-opening 20, and the belt 25 shifted onto the pulley.

Changes in the form, proportion, and minor details of construction may be resorted to without departing from the spirit or sacrificing any of the advantages of the invention. It may be further added by way of statement of advantage that although the husking-rolls may be of any approved type the same are preferably arranged in connection with a chute or trough 49ª, and by reason of their arrangement within the casing the husks and corn which are loosened up are dropped upon the separating-shoe and the usual separation takes place, thus effecting a saving in the shelled corn. In connection with the husking-rolls it may also be stated that the gearing shown is only one way of operating the same, as obviously any type of gearing may be utilized to communicate motion to the rolls.

In connection with the slidable feed-table 18 provision is preferably made for limiting the movement of this table in either direction. A simple construction for accomplishing this result is shown in the drawings and consists in providing the table at its under side with a pair of spaced stops 51, adapted to respectively engage opposite sides of a fixed stop, cleat, or bar 52 within the machine-casing.

Having thus described the invention, what is claimed as new, and desired to be secured by Letters Patent, is—

1. In a convertible machine of the class described, the casing having a fodder-discharge, cutting and shelling mechanisms arranged within the casing in contiguous relation to each other and also to said fodder-discharge, a separating-shoe arranged at the bottom of the casing, and means for covering and uncovering the fodder-discharge to permit of the independent use of the cutting mechanism or its use conjointly with the shelling mechanism.

2. A convertible machine of the class described, comprising a casing having discharge-openings at its opposite ends, closures for covering and uncovering said discharge-openings, cutting mechanism arranged within the casing contiguous to one of the discharge-openings, husking mechanism arranged within the casing and delivering through the other of said discharge-openings, a separating-shoe at the bottom of the casing, and a feed-table common to the cutting mechanism and the husking mechanism.

3. A convertible machine of the class described comprising a casing having end discharge-openings equipped with closures for covering and uncovering the same, cutting mechanism arranged in contiguous relation to one of the discharge-openings, a separating-shoe at the bottom of the casing, feed-rolls disposed at one side of the cutting mechanism and having a relative adjustment to vary the interval therebetween, husking-rolls located within the casing and delivering through the discharge-opening opposite the one adjacent to the cutting mechanism, and a top feed-table having one end adjustable toward and from the plane of said feed-rolls.

In testimony whereof I affix my signature in presence of two witnesses.

HENRY F. DIERCKS.

Witnesses:
 D. P. WOLHAUPTER,
 E. M. SHUSTER.